United States Patent
Hasegawa

(10) Patent No.: US 7,203,594 B2
(45) Date of Patent: Apr. 10, 2007

(54) FAILURE DIAGNOSTIC METHOD AND APPARATUS FOR ATMOSPHERIC PRESSURE SENSORS

(75) Inventor: Shumpei Hasegawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/353,002

(22) Filed: Feb. 14, 2006

(65) Prior Publication Data

US 2006/0184309 A1 Aug. 17, 2006

(30) Foreign Application Priority Data

Feb. 15, 2005 (JP) ............................. 2005-037574

(51) Int. Cl.
*G01M 15/05* (2006.01)
*F02D 45/00* (2006.01)

(52) U.S. Cl. .................................................. 701/114

(58) Field of Classification Search ................ 701/114, 701/110, 102, 101; 123/478, 480, 399
See application file for complete search history.

(56) References Cited

U.S. PATENT DOCUMENTS 6,584,960 B2 * 7/2003 Kishibata et al. ........... 123/478

FOREIGN PATENT DOCUMENTS

| JP | 6-201496 A | * | 7/1994 |
| JP | 10-176582 A | | 6/1998 |
| JP | 2003-307152 A | | 10/2003 |

* cited by examiner

Primary Examiner—Hieu T. Vo
(74) Attorney, Agent, or Firm—Birch, Stewart, Kolasch & Birch, LLP

(57) ABSTRACT

To identify a failed atmospheric pressure sensor in a control apparatus having two atmospheric pressure detecting systems as a failsafe. A first comparing unit outputs an abnormal signal when a difference between atmospheric pressures detected by two sensors is larger than a threshold value. An atmospheric pressure estimating unit estimates the atmospheric pressure from an engine revolution, a throttle opening, and a manifold pressure. The difference calculating unit calculates a difference between the detected atmospheric pressure and the estimated atmospheric pressure. The difference calculating unit calculates a difference between the detected atmospheric pressure and the estimated atmospheric pressure. When an abnormal signal is outputted from the first comparing unit, a second comparing unit compares the differences in response thereto. The failed atmospheric pressure sensor is identified according to which one of the differences is larger.

14 Claims, 5 Drawing Sheets

FAILURE DIAGNOSTIC METHOD AND APPARATUS FOR ATMOSPHERIC PRESSURE SENSORS

CROSS-REFERENCE TO RELATED APPLICATIONS

This nonprovisional application claims priority under 35 U.S.C. § 119(a) on Patent Application No. 2005-037574, filed in Japan on Feb. 15, 2005, the entirety of which is incorporated herein by reference.

BACKGROUND OF THE INVENTION

1. Field of the Invention

The present invention relates to a failure diagnostic apparatus for atmospheric pressure sensors used in an engine control system. More specifically, the present invention relates to a failure diagnostic method and apparatus for atmospheric pressure sensors in a system having a first atmospheric pressure sensor and a second atmospheric pressure sensor that backs up the first atmospheric pressure sensor.

2. Description of Background Art

Hitherto, a number of sensors have been used in an engine control system and a failure diagnostic system for diagnosing whether or not these sensors are normal is known. For example, JP-A-2003-307152 discloses a method including a step of determining whether or not an output signal of a sensor that senses pressure in an intake manifold is within a preset range, a step of calculating the pressure in the intake manifold on the basis of engine operating conditions, and a step of determining whether or not a difference between the pressure in the intake manifold indicated by the output signal from the sensor and the calculated pressure in the intake manifold is smaller than a set value when the output signal from the sensor is within the range, wherein when the output signal from the sensor is not within the range or when the difference is not smaller than the set value, the calculated pressure is set as the pressure in the intake manifold.

In an electronically controlled throttle apparatus disclosed in JP-A-10-176582, two systems each including an accelerator sensor, a throttle sensor, and so on are provided as a failsafe device or the like. Failure diagnosis is performed by comparing sensor outputs of the two systems. For example, by comparing a deviation between a main throttle sensor and a sub throttle sensor and a predetermined threshold value, it is determined whether or not the throttle sensor has failed.

Failures such as a disconnection and a short circuit of the sensor system can be determined when a sensor output value is too high or too low with respect to a predetermined value or a predetermined range. These types of failures can be addressed in a manner that is determined in advance. However, in some situations, a change or a deterioration of output characteristics, which may impair normal control even though the sensor output value is within the predetermined range, cannot be determined as a failure.

On the other hand, the diagnostic method disclosed in JP-A-10-176582 can detect that either one of the two system sensors has failed. However, it is difficult to determine which one of the two system sensors has failed.

SUMMARY OF THE INVENTION

It is an object of the invention to provide a failure diagnostic method and apparatus for atmospheric pressure sensors, which can reliably detect which atmospheric pressure sensor has a failure, in a system having two systems of atmospheric pressure sensors.

In order to achieve the above-described object, an embodiment of the present invention is directed to a failure diagnostic method for atmospheric pressure sensors used in an engine control system having a first atmospheric pressure sensor that performs main control, a second atmospheric pressure sensor that backs up the first atmospheric pressure sensor, a manifold pressure sensor, an engine revolution detector, and a throttle sensor. The method includes the steps of calculating an estimated atmospheric pressure on the basis of the engine revolution, a throttle opening, and a manifold pressure value, determining that a failure has occurred when a difference between an output from the first atmospheric pressure sensor and an output from the second atmospheric pressure sensor exceeds a predetermined range, and if it has been determined that a failure has occurred, identifying one of the first and second atmospheric pressure sensors as a failed sensor, if a difference between the output and the estimated atmospheric pressure is larger.

An embodiment of the present invention is also directed to a failure diagnostic apparatus for atmospheric pressure sensors used in an engine control system having a first atmospheric pressure sensor that performs main control, a second atmospheric pressure sensor that backs up the first atmospheric pressure sensor, a manifold pressure sensor, an engine revolution detector, and a throttle sensor. The apparatus includes an abnormality recognizing unit that outputs an abnormal signal when a difference between a first detected atmospheric pressure value detected by the first atmospheric pressure sensor and a second detected atmospheric pressure value detected by the second atmospheric pressure sensor exceeds a threshold value, an atmospheric pressure estimating unit that outputs an estimated atmospheric pressure value in response to input of the engine revolution, throttle openings, and a manifold pressure value according to a predetermined mutual relation among the engine revolution, the throttle opening, a manifold pressure and an atmospheric pressure, and an abnormality identifying unit that calculates differences between the first detected atmospheric pressure value and the second detected atmospheric pressure value with respect to the estimated atmospheric pressure value, respectively, and identifies the atmospheric pressure sensor that detected the atmospheric pressure value having a calculated difference that is larger as a failed sensor, wherein identification of the failed sensor by the abnormality identifying unit is performed in response to an output of the abnormal signal.

According to a further aspect of the present invention the determination of the differences by the abnormality recognizing unit and the abnormality identifying unit are performed using absolute values of the differences.

According to a further aspect of the present invention, the abnormality recognizing unit outputs an abnormal signal when a ratio value between a first detected atmospheric pressure value detected by the first atmospheric pressure sensor and a second detected atmospheric pressure value detected by the second atmospheric pressure sensor is deviated from a predetermined range, the atmospheric pressure estimating unit outputs an estimated atmospheric pressure value in response to input of the engine revolution, throttle openings, and a manifold pressure value according to a predetermined mutual relation among the engine revolution, a throttle opening, a manifold pressure, and an atmospheric pressure, and the abnormality identifying unit calculates the differences of the first detected atmospheric pressure value and the second detected atmospheric pressure value with respect to the estimated atmospheric pressure value respectively and identifies the atmospheric pressure sensor that detects the atmospheric pressure value having a calculated difference that is larger as a failed sensor, wherein identification of the failed sensor by the abnormality identifying unit is performed in response to an output of the abnormal signal.

According to an embodiment of the present invention, it is recognized that at least one of the first and second atmospheric pressure sensors has failed when the difference between the outputs of the first and second atmospheric pressure sensors is large. When the abnormality is determined, the differences between the pressures detected by the first and second atmospheric pressure sensors and the estimated atmospheric pressure calculated on the basis of the engine revolution, the throttle opening, and the manifold pressure are calculated. The atmospheric pressure sensor that has detected the pressure corresponding to the larger difference (for example, the ratio value farther from the predetermined value) can be determined as a failed sensor.

Therefore, abnormalities can be detected, which cannot be detected by the failure detecting means in the background art, which determines an abnormality of a sensor only from the fact that the output of the sensor is simply deviated from the predetermined range, for example, the sensor that has a function that is lowered by deterioration.

Accordingly, for example, in the engine control system having two atmospheric pressure detection systems as a failsafe in which when one of the detection systems is failed, the other detection system backs it up, it can be determined whether both of the atmospheric pressure detection systems are normal or whether they have failed. Based on this determination, a compensating operation required to the control system is enabled. The compensating operation includes usage of a substitute value or switching to a backup system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
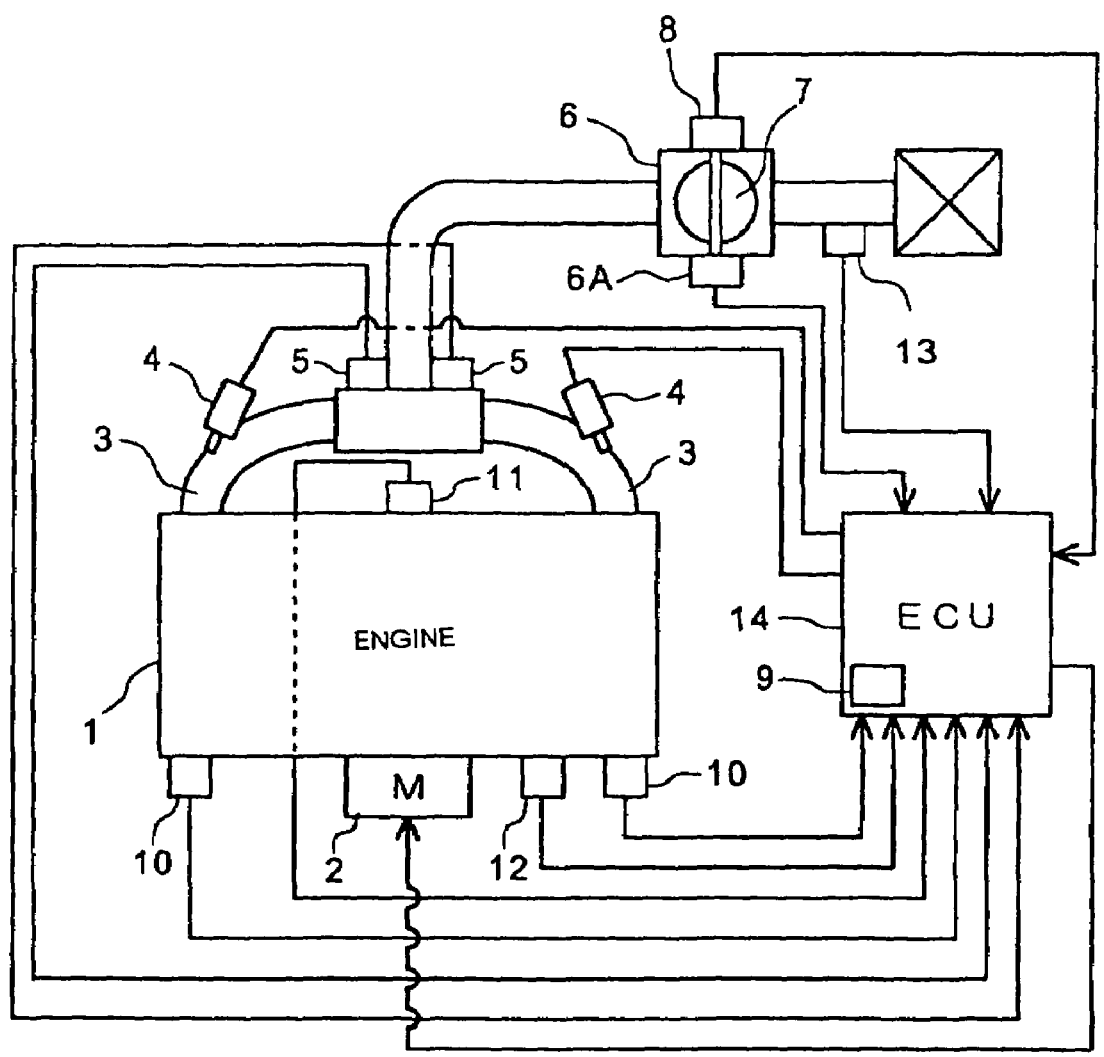
FIG. 2 is a general drawing showing an engine control system including the diagnostic apparatus according to the embodiment of the present invention.

Referring now to the drawings, an embodiment of the invention will be described. FIG. 2 is a block diagram of a principal portion of an engine including a failure diagnostic apparatus. In FIG. 2, an engine 1 is a reciprocal internal combustion engine for an airplane, and is provided with a starter motor 2 for activation. Although components for two cylinders are shown in FIG. 2, the number of cylinders in the engine 1 is not limited. An intake manifold 3 of the engine 1 is provided with fuel injection valves 4, and manifold pressure sensors 5 on an upstream side of the fuel injection valve 4 for detecting a pressure in the intake manifold 3. A throttle body 6 is provided on an upstream side of the manifold pressure sensor 5, and a throttle valve 7 is assembled in the throttle body 6. The throttle valve 7 is driven by a motor 8. The throttle body 6 is provided with a throttle sensor 6A for detecting a throttle opening. Known sensors required for controlling the engine 1 such as an atmospheric pressure senor 9, a cam pulser 10, a crank pulser 11, a cooling water temperature sensor 12, and an air temperature sensor 13, and so on are further provided for controlling the engine 1.

An electronic control unit (ECU) 14 for performing fuel injection or ignition control according to a program upon reception of output signals from the respective sensors described above is provided. The ECU 14 includes a failure diagnostic function for the atmospheric pressure sensor 9.

Figure 3:
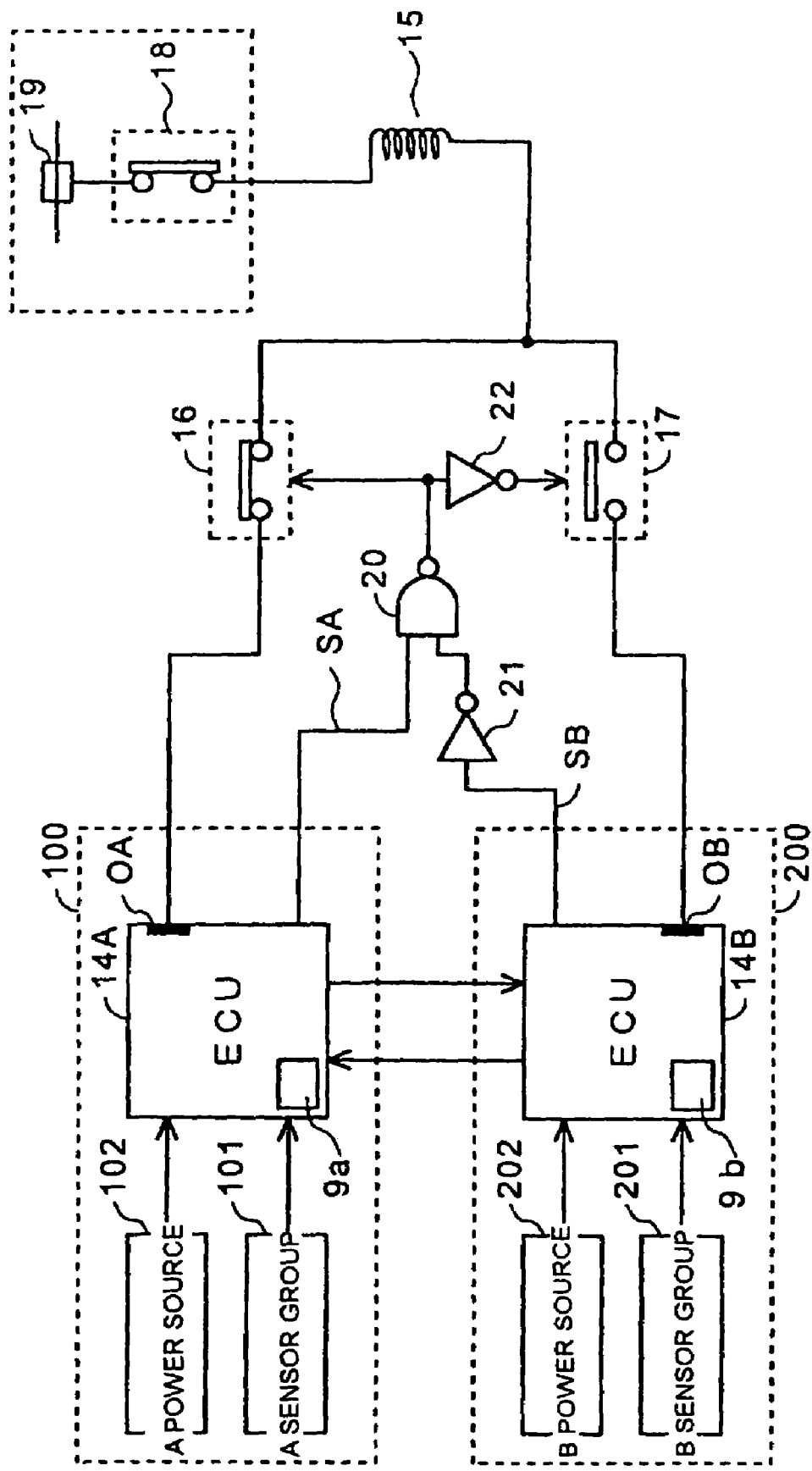
FIG. 3 is a block diagram showing a principal portion of the engine control system including the diagnostic apparatus according to the embodiment of the present invention.

FIG. 3 is a block diagram showing a general structure of the engine control system described above. As shown in FIG. 3, the control system of this embodiment is provided with two systems of detection circuits for the sensors and the ECUs 14 as a failsafe device. These systems are referred to as the A lane 100 and the B lane 200, respectively. The A lane 100 includes an A sensor group 101 including the sensors described in conjunction with FIG. 2, an A power unit 102, and an ECU 14A for the A lane. Likewise, the B lane 200 includes a B sensor group 201, a B power source 202, and an ECU 14B for the B lane. Although the atmospheric pressure sensors 9 (9a and 9b) are provided on a circuit board which constitutes the ECU 14A and the ECU 14B or in housings (not shown) of the ECUs 14A and 14B in this embodiment, the positions of installation are not limited thereto.

The ECUs 14A and 14B are capable of communicating with each other in both ways via communication interfaces of one another, not shown. One end (minus side) of each drive coil of the fuel injection valve 4 provided for each cylinder (only one is shown) is connected to injection signal output terminals OA and OB of the ECUs 14A and 14B respectively via change-over switches 16, 17. The other end (plus side) of the drive coil 15 is connected to a power source 19, which outputs, for example, a voltage of 14 volt via a power switch 18. The power switch 18 is provided with a current limiting function. The power sources 19 and the power switches 18 are provided in the ECUs 14A and 14B, respectively.

A switching signal SA outputted from the ECU 14A is connected to an input side of an NAND circuit 20 on one side, and a switching signal SB outputted from the ECU 14B on an input side of the NAND circuit 20 on the other side via an NOT circuit 21. An output from the NAND circuit 20 is supplied to the change-over switch 16 and also to the change-over switch 17 via another NOT circuit 22.

Power is distributed from the power source 19 to the drive coil 15 depending on the condition of the injection signal output terminal of the lane which is connected to one of the change-over switches 16, 17 selected by the switching signals SA and SB. The valve-open duration of the fuel injection valve 4, that is, the amount of fuel injection is determined by the duration of this power distribution.

Figure 4:
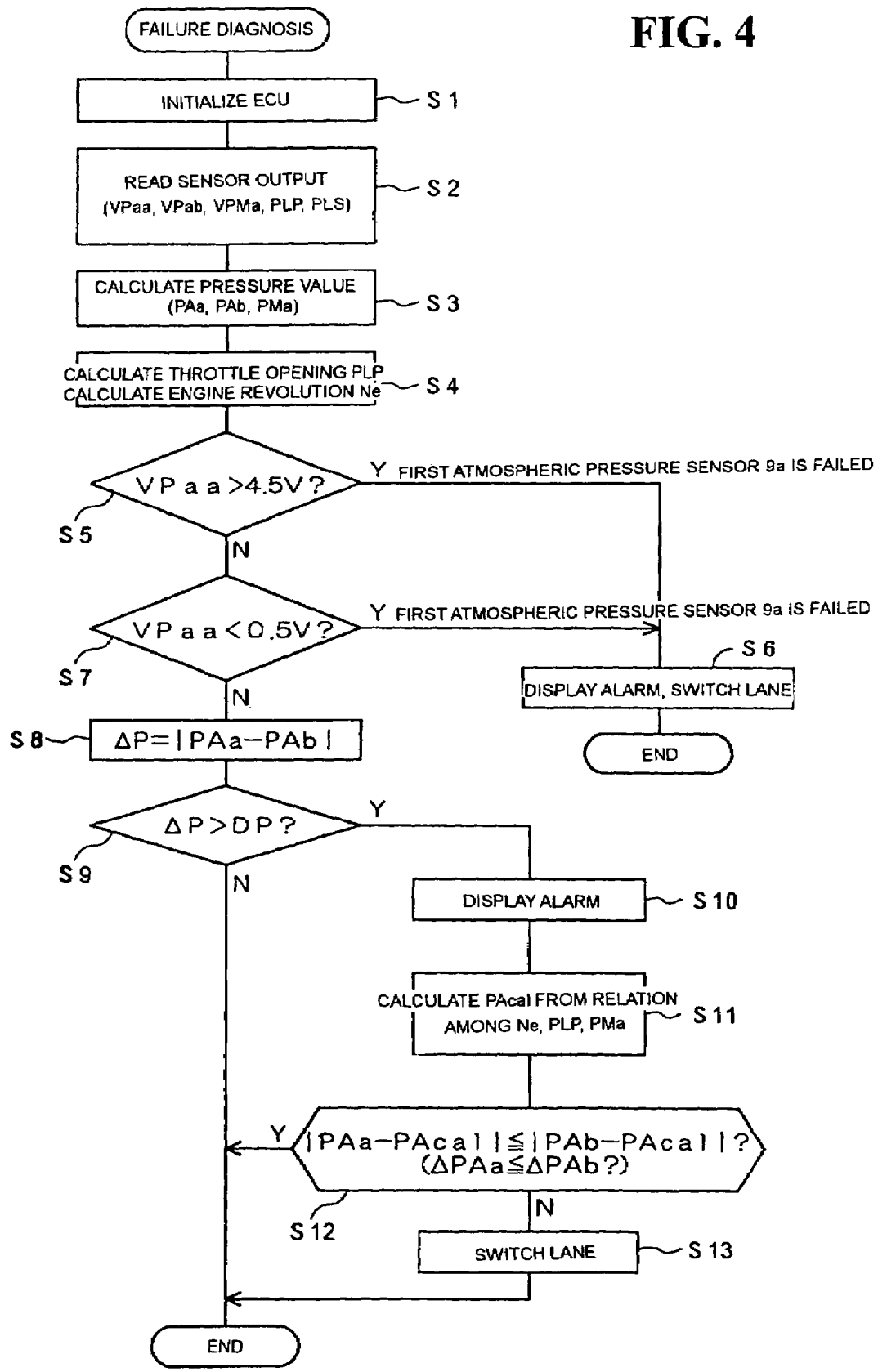
FIG. 4 is a flowchart showing a process of the principal portion of the diagnostic apparatus according to the embodiment of the present invention.

Subsequently, a failure diagnostic function of the atmospheric pressure sensors 9a and 9b contained in the ECUs 14A and 14B will be described. In this embodiment, the A lane 100 is for main control and the B lane 200 serves as a backup. FIG. 4 is a flowchart of a failure diagnostic processing of the atmospheric pressure sensors 9a and 9b. The process shown in FIG. 4 is activated when a starting switch of the engine 1 is switched from OFF to ON. In step S1, the ECUs 14A and 14B are initialized. In Step S2, an output voltage VPaa of the atmospheric pressure sensor (first atmospheric pressure sensor) 9a of the A lane 100, an output voltage VPab of the atmospheric pressure sensor (second atmospheric pressure sensor) 9b of the B lane 200, an output voltage VPMa of the manifold pressure sensor 5 of the A lane 100, an output PLP of the throttle sensor 6A, and crank pulse PLS outputted from the crank pulser 11 of the A lane 100 are read.

In Step S3, physical values PAa, PAb, and PMa (unit: mmHg) of the pressure are calculated on the basis of the output voltages VPaa, VPab, and VPMa. For example, the output voltages are converted to the physical values using a prepared conversion table. In step S4, an output of the throttle sensor 6A is read and a throttle opening PLP is calculated, and the engine revolution Ne (rpm) is calculated on the basis of the crank pulse PLS. The engine revolution Ne can be calculated from intervals of the crank pulse PLS.

In Step S5, whether or not the voltage VPaa exceeds a predetermined upper limit value (4.5 volts in this case) is determined. If the result of determination is affirmative, it is determined that the atmospheric pressure sensor 9a is failed due to short circuit or the like. Therefore, the procedure goes to Step S6, where an alarm display or a process of switching the lane from the A lane 100 to the B lane 200 is performed as a process against abnormality. When the result of Step S5 is negative, the procedure goes to Step S7.

In Step S7, whether or not the voltage VPaa is smaller than a predetermined lower limit (0.5 volts for example) is determined. When the result of this determination is affirmative, it is determined that the atmospheric pressure sensor 9a has failed due to a disconnection or the like. Therefore, the procedure goes to Step S6 and the process against abnormality is performed. As regards the alarm display in Step S6, for example, a system fail alarm lamp is illuminated to notify information "no problem for continued flight, but early inspection and service are necessary" to a pilot.

When the determination in Step S7 is negative, it is determined that there is no failure such as a short circuit or a disconnection in the atmospheric pressure sensor 9a. However, there is a case in which the output voltage VPaa falls within the range defined by the upper limit value and the lower limit value even though a functional abnormality occurred in the atmospheric pressure sensor 9a due to deterioration or the like and hence the normal pressure value is not outputted from the atmospheric pressure sensor 9a. Therefore, the functional abnormality due to deterioration cannot be determined by the process in Steps S5 and S7.

Therefore, whether or not there is any deterioration in the atmospheric pressure sensor 9a is determined by the following process. As regards the engine 1, it is known that an atmospheric pressure PA in an engine operating environment, the engine revolution Ne, and the throttle opening PLP, and the manifold pressure PMa have a certain relation.

Therefore, it is understood that using this relation, the atmospheric pressure PA can be estimated from the engine revolution Ne, the throttle opening PLP, and the manifold pressure PMa by calculation. Hereinafter, the atmospheric pressure obtained by calculation is referred to as an estimated atmospheric pressure PAcal. The relations among the atmospheric pressure PA, the engine revolution Ne, the throttle opening PLP, and the manifold pressure PMa are obtained experimentally in advance, and the relations are stored in the storing unit in the ECU 14, so that the estimated atmospheric pressure PAcal can be calculated easily on the basis of the engine revolution Ne in reference to this data, the throttle opening PLP and the manifold pressure PMa.

In Step S8, a difference ΔP between the atmospheric pressures PAa and PAb is calculated. The difference ΔP is obtained as an absolute value. In Step S9, whether or not the difference ΔP is larger than a threshold value DP is determined. The threshold value DP is 44.8 mmHg for example. Since it seems unlikely that the atmospheric pressure sensors 9a and 9b are deteriorated by the same extent at the same time, when the difference ΔP is smaller than the threshold value DP, it is determined that the atmospheric pressure sensors 9a and 9b are operated normally, and hence the normal control loop is continued.

When the difference ΔP is larger than the threshold value DP, it is determined that either one of the atmospheric pressure sensors 9a and 9b is functionally abnormal, the procedure goes to Step S10, where the alarm display for notifying the abnormality is executed. In this case, a service request lamp, which gives a different instruction from the system fail alarm lamp is illuminated indicating that "if it is before takeoff, stop takeoff operation, and if after takeoff, discontinue the flight for inspection and service."

Then, in the following process, a failed sensor is identified out of the atmospheric pressure sensors 9a and 9b by using the relations among the atmospheric pressure PA, the engine revolution Ne, the throttle opening PLP, and the manifold pressure PMa. In Step S1, the estimated atmospheric pressure PAcal is calculated on the basis of the engine revolution Ne, the throttle opening PLP and the manifold pressure PMa. The relations among the atmospheric pressure PA, the engine revolution Ne, the throttle opening PLP, and the manifold pressure PMa used for obtaining the estimated atmospheric pressure PAcal will be described later in detail.

In Step S12, an absolute value ΔPAa of the difference between the atmospheric pressure PAa detected by the atmospheric pressure sensor 9a and the estimated atmospheric pressure PAcal and an absolute value ΔPAb of the difference between the atmospheric pressure PAb detected by the atmospheric pressure sensor 9b and the estimated atmospheric pressure PAcal are compared.

When the result of determination in Step S12 is negative, it is determined that abnormality such as deterioration is occurred in the atmospheric pressure sensor 9a. Therefore, the procedure goes to Step S13 to switch the lane, and the output of the B lane 200 is employed for controlling the engine. In this case as well, it is recommended to illuminate the system fail alarm lamp.

When the determination in Step S12 is affirmative, it is determined that abnormality such as deterioration is occurred in the atmospheric pressure sensor 9b. In this case, since the abnormality is not occurred in a normal control lane, that is, the A lane 100 which is a main body of control, control by the A lane 100 as the normal control lane is continued.

Figure 5:
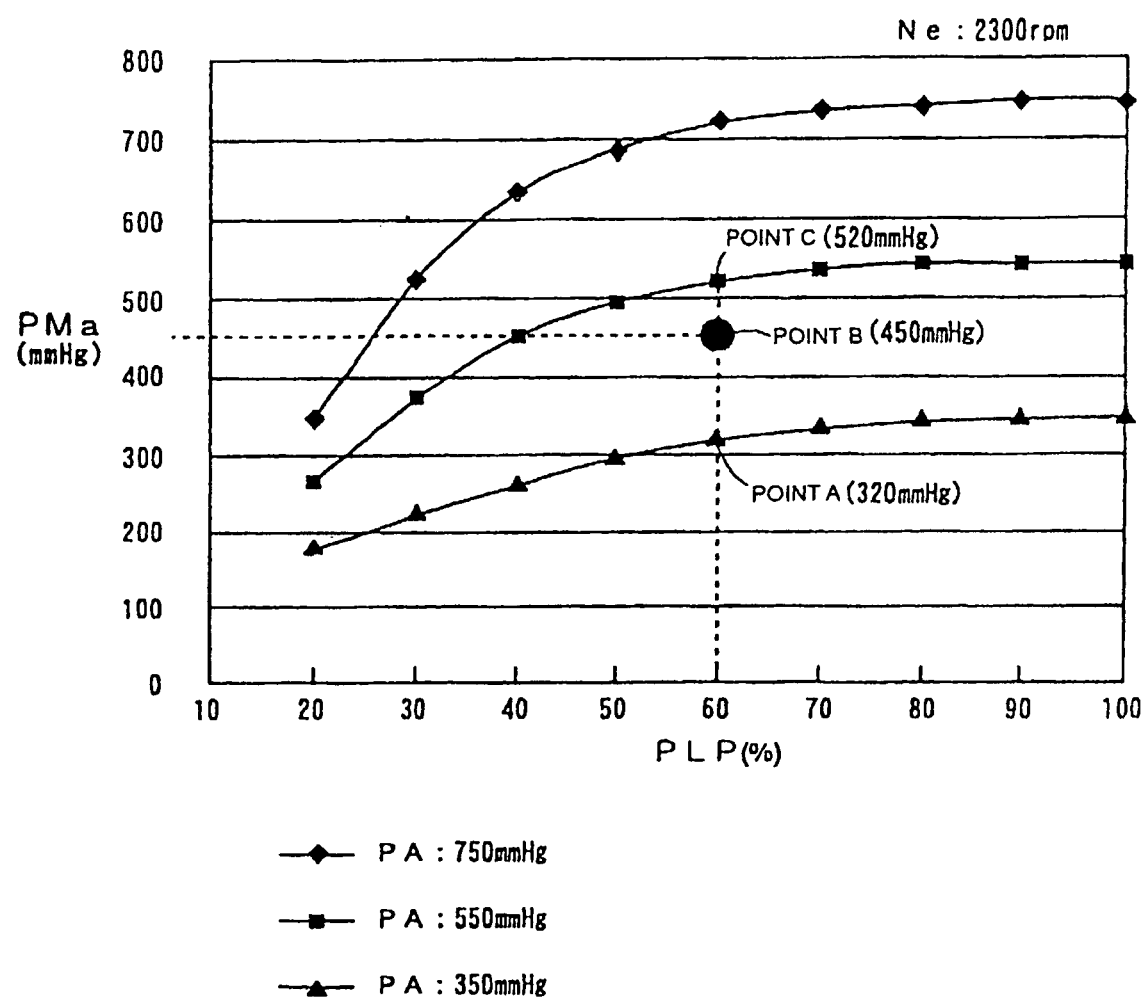
FIG. 5 is a drawing showing an example of a data table used in calculation of an estimated atmospheric pressure.

FIG. 5 is a data table showing the relations among the atmospheric pressure PA at the specific engine revolution (2300 rpm), the manifold pressure PMa, and the throttle opening PLP. The data is obtained when the atmospheric pressure PA is set to a predetermined value (750 mmHg, 550 mmHg, 350 mmHg) in a test apparatus in which the atmospheric pressure PA can be set to various values, and the engine 1 is operated at the number of revolution Ne of 2300 rpm. Using this data, the atmospheric pressure PA when the throttle opening PLP is 60%, and the manifold pressure PMa is 450 mmHg is obtained. In FIG. 5, intersections between a line of 60% in the throttle opening PLP (vertical dotted line) and curved lines representing 350 mmHg and 550 mmHg in atmospheric pressure PA are represented respectively as point A and point C, and the intersection between the line (lateral dotted line) representing 450 mmHg in manifold pressure PMa and the vertical dotted line is represented as point B. The atmospheric pressure Pacal indicated by the point B can be obtained by the interpolating calculation on the basis of the atmospheric pressure PA at the point A and the point C. In other words, the coordinates of the respective points A, B, C (PLP, PMa, PA) are A (60, 320, 350), B (60, 450, pacal), and C (60, 520, 550), and the estimated atmospheric pressure Pacal is calculated by the following expression.

PAcal=350+(450−320)/(520−320)×(550−350)

According to this expression, the estimated atmospheric pressure PAcal is obtained as 480 mmHg.

For example, by creating the data tables as shown in FIG. 5, for example, in increments of 500 rpm from 500 rpm to the upper limit of usage 3000 rpm and storing these tables in the ECU 14, the estimated atmospheric pressure PAcal according to various numbers of engine revolutions can be calculated.

Figure 1:
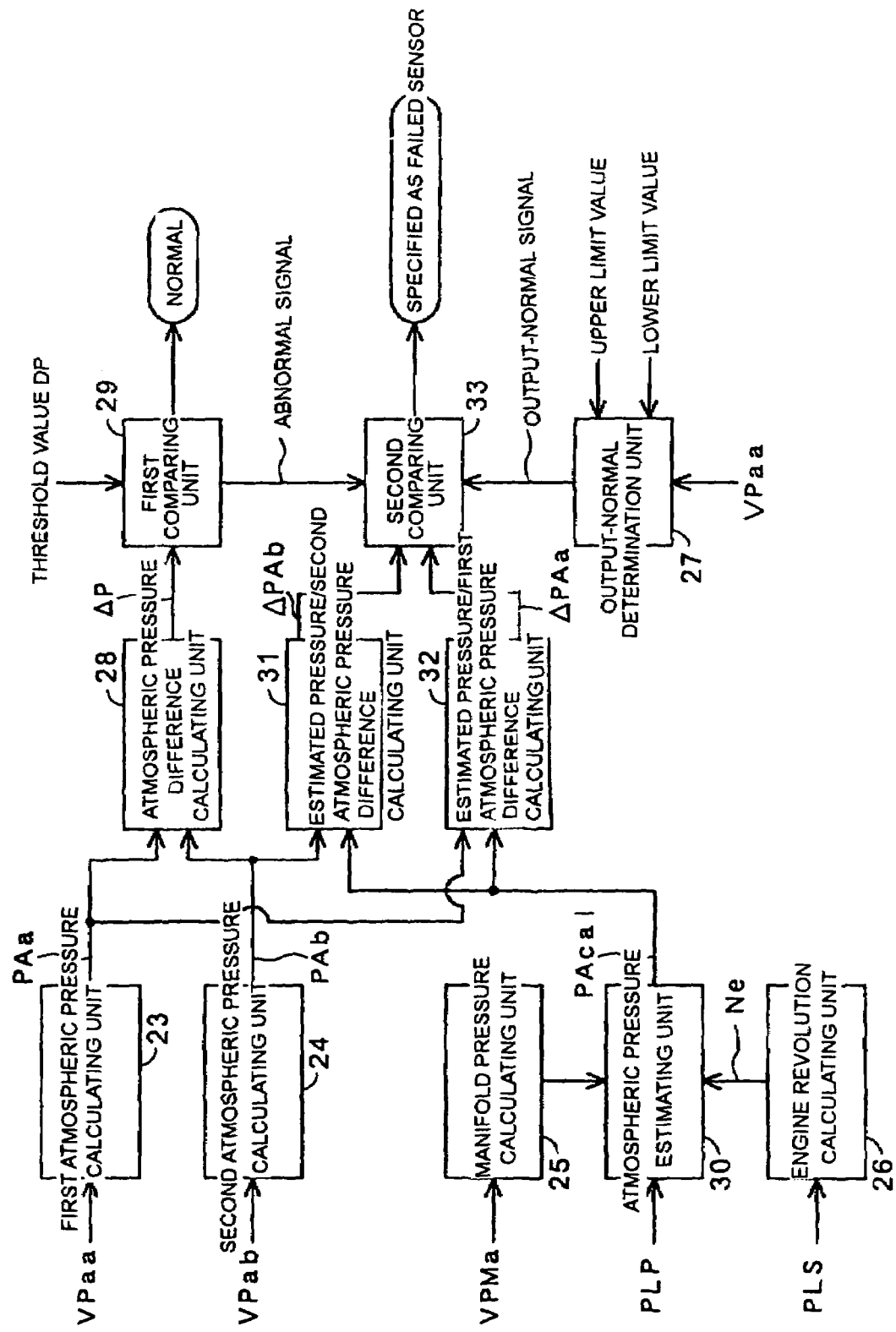
FIG. 1 is a block diagram showing a function of a principal portion of a diagnostic apparatus according to an embodiment of the present invention.

FIG. 1 is a block diagram showing a function of the principal portion of the ECU 14A which performs the processing described in conjunction with the flowchart in FIG. 4. A first atmospheric pressure calculating unit 23 calculates the atmospheric pressure PAa on the basis of values VPaa detected by the atmospheric pressure sensor 9a. A second atmospheric pressure calculating unit 24 calculates the atmospheric pressure PAb on the basis of values VPab detected by the atmospheric pressure sensor 9b. A manifold pressure calculating unit 25 calculates the manifold pressure PMa on the basis of values VPMa detected by the manifold pressure sensor 5. The engine revolution calculating unit 26 calculates the engine revolution Ne on the basis of the crank pulse PLS.

An output-normal determination unit 27 determines whether or not the value VPaa detected by the atmospheric pressure sensor 9a exists in the predetermined range, that is, between the upper limit value and the lower limit value, and if the detected value VPaa is within the predetermined range, an output-normal signal is supplied.

An atmospheric pressure difference calculating unit 28 calculates the difference ΔP between the atmospheric pressure PAa and the atmospheric pressure PAb. A first comparing unit 29 compares the difference ΔP and the threshold value DP, and when the difference ΔP is smaller, outputs a normal signal, and when it is larger, outputs an abnormal signal. The atmospheric pressure difference calculating unit 28 and the first comparing unit 29 constitute the abnormality recognizing unit.

An atmospheric pressure estimating unit 30 calculates the estimated atmospheric pressure PAcal from the engine revolution Ne, the throttle opening PLP, and the manifold pressure PMa. For example, the atmospheric pressure estimating unit 30 utilizes the data table as shown in FIG. 5 and estimates the atmospheric pressure. An estimated pressure/second atmospheric pressure difference calculating unit 31 calculates the difference ΔPAb between the atmospheric pressure PAb and the estimated atmospheric pressure PAcal. An estimated pressure/first atmospheric pressure difference calculating unit 32 calculates the difference ΔPAa between the atmospheric pressure PAa and the estimated atmospheric pressure PAcal. A second comparing unit 33 compares the difference ΔPAa and the difference ΔPAb in response to an input of the abnormal signal from the first comparing unit 29 and the output-normal signal from the output-normal determination unit 27. Depending on which one of the difference ΔPAa and the difference ΔPAb is larger, when the difference ΔPAa is larger, it is determined that the atmospheric pressure sensor 9a is abnormal, and when the difference ΔPAb is larger, it is determined that the atmospheric pressure sensor 9b is abnormal. The estimated pressure/second atmospheric pressure difference calculating unit 31, the estimated pressure/first atmospheric pressure difference calculating unit 32, and the second comparing unit 33 constitute the abnormality identifying unit.

As described above, according to this embodiment, in a system including atmospheric pressure sensors provided in a plurality of systems, the atmospheric pressure is estimated from the engine revolution Ne, the throttle opening PLP, and the manifold pressure for identifying the atmospheric pressure sensor whose function is lowered due to deterioration or the like, so that the failed atmospheric pressure sensor can be identified on the basis of the difference between the estimated atmospheric pressure PAcal and the respective pressures detected by respective atmospheric pressure sensors.

In the embodiment described above, determination of abnormality and specification of the failed sensor are performed on the basis of the difference between the pressure values detected by the first atmospheric pressure sensor 9a and the second atmospheric pressure sensor 9b, and the pressure values detected by the first atmospheric pressure sensor 9a and the second atmospheric pressure sensor 9b with respect to the estimated atmospheric pressure value.

However, the invention is not limited thereto. Not on the basis of the difference between the respective pressure values, determination of abnormality and specification of the failed sensor can be performed on the basis of the ratio value. For example, the atmospheric pressure difference calculating unit 28 may be replaced by a unit that calculates the ratio value between the pressures PAa and PAb. Then, the first comparing unit 29 is adapted to determine whether both of the first atmospheric pressure sensor 9a and the second atmospheric pressure sensor 9b are normal, or at least one of them is failed depending on whether the calculated ratio value is within the predetermined range from a predetermined value, that is, "1". For example, when the pressure PAa/PAb is within the range from 0.95 to 1.05, it is determined that both of the atmospheric pressure sensors 9a and 9b are normal, and when it is out of the range, it is determined that at least one of the first and second atmospheric pressure sensors 9a and 9b is abnormal.

In the same manner, the estimated pressure/second atmospheric pressure difference calculating unit 31 is replaced by a unit that calculates the ratio value between the detected atmospheric pressure PAa and the estimated atmospheric pressure PAcal, and the estimated pressure/first atmospheric pressure difference calculating unit 32 by a unit for calculating the ratio value between the detected atmospheric pressure PAb and the estimated atmospheric pressure PAcal. Then, the second comparing unit 33 is adapted to specify that the atmospheric pressure sensor corresponding to the pressure value which corresponds to the sensor whose calculated ratio value is farther from the predetermined value, that is, "1" is the failed sensor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A failure diagnostic apparatus for atmospheric pressure sensors used in an engine control system having a first atmospheric pressure sensor that performs main control, a second atmospheric pressure sensor that backs up the first atmospheric pressure sensor, a manifold pressure sensor, an engine revolution detector, and a throttle sensor, said failure diagnostic apparatus comprising:
an abnormality recognizing unit that outputs an abnormal signal when a difference between a first detected atmospheric pressure value detected by the first atmospheric pressure sensor and a second detected atmospheric pressure value detected by the second atmospheric pressure sensor exceeds a threshold value;
an atmospheric pressure estimating unit that outputs an estimated atmospheric pressure value in response to input of engine revolution, a throttle opening, and a manifold pressure value according to a predetermined mutual relation among the engine revolution, the throttle opening, and the manifold pressure, and the atmospheric pressure; and
an abnormality identifying unit that calculates differences between the first detected atmospheric pressure value and the second detected atmospheric pressure value with respect to the estimated atmospheric pressure value, respectively, and identifies as a failed sensor the atmospheric pressure sensor that detected the atmospheric pressure value having a larger calculated difference,
wherein identification of the failed sensor by the abnormality identifying unit is performed in response to an output of the abnormal signal.

2. The failure diagnostic apparatus for atmospheric pressure sensors according to claim 1, wherein the determination of differences by the abnormality recognizing unit and the abnormality identifying unit are performed using absolute values of the differences.

3. The failure diagnosis apparatus for atmospheric pressure sensors according to claim 1, wherein the abnormality recognizing unit calculates physical values of the outputs of the first and second atmospheric pressure sensors from the voltages of the first and second atmospheric pressure sensors.

4. The failure diagnosis apparatus for atmospheric pressure sensors according to claim 3, wherein the abnormality recognizing unit determines that a failure has occurred if the voltages of the first or second atmospheric pressure sensors are above a predetermined upper limit or below a predetermined lower limit.

5. The failure diagnosis apparatus for atmospheric pressure sensors according to claim 3, wherein the abnormality recognizing unit calculates the physical values of the outputs of the first and second atmospheric pressure sensors from the output voltages of the first and second atmospheric pressure sensors by using a conversion table.

6. A failure diagnostic apparatus for atmospheric pressure sensors used in an engine control system having a first atmospheric pressure sensor that performs main control, a second atmospheric pressure sensor that backs up the first atmospheric pressure sensor, a manifold pressure sensor, an engine revolution detector, and a throttle sensor, said failure diagnostic apparatus comprising:
an abnormality recognizing unit that outputs an abnormal signal when a ratio value between a first detected atmospheric pressure value detected by the first atmospheric pressure sensor and a second detected atmospheric pressure value detected by the second atmospheric pressure sensor is deviated from a predetermined range;
an atmospheric pressure estimating unit that outputs an estimated atmospheric pressure value in response to input of engine revolution, throttle openings and a manifold pressure value according to a predetermined mutual relation among the engine revolution, the throttle opening, and the manifold pressure, and an atmospheric pressure; and
an abnormality identifying unit that calculates a ratio value between the first detected atmospheric pressure value and the second detected atmospheric pressure value with respect to the estimated atmospheric pressure value, respectively, and identifies as the failed sensor the atmospheric pressure sensor that detected the atmospheric pressure value having a calculated ratio value that is deviated more from the predetermined value,
wherein identification of the failed sensor by the abnormality identifying unit is performed in response to an output of the abnormal signal.

7. The failure diagnosis apparatus for atmospheric pressure sensors according to claim 6, wherein the abnormality recognizing unit calculates physical values of the outputs of the first and second atmospheric pressure sensors from the voltages of the first and second atmospheric pressure sensors.

8. The failure diagnosis apparatus for atmospheric pressure sensors according to claim 7, wherein the abnormality recognizing unit determines that a failure has occurred if the voltages of the first or second atmospheric pressure sensors are above a predetermined upper limit or below a predetermined lower limit.

9. The failure diagnosis apparatus for atmospheric pressure sensors according to claim 7, wherein the abnormality recognizing unit calculates the physical values of the outputs of the first and second atmospheric pressure sensors from the output voltages of the first and second atmospheric pressure sensors by using a conversion table.

10. A failure diagnostic method for atmospheric pressure sensors used in an engine control system having a first atmospheric pressure sensor that performs main control, a second atmospheric pressure sensor that backs up the first atmospheric pressure sensor, a manifold pressure sensor, an engine revolution detector, and a throttle sensor, said method comprising the steps of:
calculating an estimated atmospheric pressure on the basis of engine revolution, a throttle opening, and a manifold pressure value,
determining that a failure has occurred when a difference between an output from the first atmospheric pressure sensor and an output from the second atmospheric pressure sensor exceeds a predetermined range; and
if it has been determined that a failure has occurred, identifying one of the first and second atmospheric pressure sensors as a failed sensor by determining which of the first and second atmospheric pressure sensors has a difference between the output and the estimated atmospheric pressure that is larger.

11. The failure diagnosis method for atmospheric pressure sensors according to claim 10, wherein the step of determining that a failure has occurred further comprises the step of using the absolute value of the differences.

12. The failure diagnosis method for atmospheric pressure sensors according to claim 10, further comprising the step of calculating the physical values of the outputs of the first and second atmospheric pressure sensors from the voltages of the first and second atmospheric pressure sensors.

13. The failure diagnosis method for atmospheric pressure sensors according to claim 12, further comprising the step of determining that a failure has occurred if the voltages of the first or second atmospheric pressure sensors are above a predetermined upper limit or below a predetermined lower limit.

14. The failure diagnosis method for atmospheric pressure sensors according to claim 12, wherein the step of calculating the physical values of the outputs of the first and second atmospheric pressure sensors from the output voltages of the first and second atmospheric pressure sensors further comprises the step of using a conversion table.

* * * * *